United States Patent
Hutmacher et al.

(10) Patent No.: US 12,014,280 B2
(45) Date of Patent: Jun. 18, 2024

(54) MEASURING THE SENSITIVITY OF NEURAL NETWORK IMAGE CLASSIFIERS AGAINST ADVERSARIAL ATTACKS

(71) Applicant: Robert Bosch GmbH, Stuttgart (DE)

(72) Inventors: Robin Hutmacher, Renningen (DE); Jan Hendrik Metzen, Boeblingen (DE); Nicole Ying Finnie, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 687 days.

(21) Appl. No.: 17/187,255

(22) Filed: Feb. 26, 2021

(65) Prior Publication Data
US 2021/0303732 A1    Sep. 30, 2021

(30) Foreign Application Priority Data
Mar. 27, 2020    (EP) .................................... 20166223

(51) Int. Cl.
*G06F 21/64*    (2013.01)
*G06N 3/04*    (2023.01)
(Continued)

(52) U.S. Cl.
CPC .............. *G06N 3/088* (2013.01); *G06F 21/64* (2013.01); *G06N 3/045* (2023.01); *G06N 3/08* (2013.01);
(Continued)

(58) Field of Classification Search
CPC .......... G06N 3/088; G06N 3/045; G06N 3/08; G06V 20/582; G06V 10/82; G06V 10/774; G06V 20/56; G06F 21/64
See application file for complete search history.

(56) References Cited

U.S. PATENT DOCUMENTS

2019/0102528 A1\*    4/2019    Beacham ............... G06V 10/82
2019/0188524 A1\*    6/2019    He .......................... G06F 18/28
(Continued)

FOREIGN PATENT DOCUMENTS

DE    102017218889 A1    4/2019

OTHER PUBLICATIONS

Fawzi, Alhussein, Hamza Fawzi, and Omar Fawzi. "Adversarial vulnerability for any classifier." Advances in neural information processing systems 31 (2018). (Year: 2018).\*

(Continued)

*Primary Examiner* — Kambiz Zand
*Assistant Examiner* — Afaq Ali
(74) *Attorney, Agent, or Firm* — NORTON ROSE FULBRIGHT US LLP; Gerard A. Messina

(57) ABSTRACT

A method for measuring the sensitivity of a classifier for digital images against adversarial attacks. The classifier includes at least one neural network. The method includes: providing a digital image for which the sensitivity is to be measured; providing a generator that is trained to map elements of a latent space to a realistic image; obtaining, according to a set of parameters, an element of the latent space; mapping, using the generator, this element to a disturbance in the space of realistic images; perturbing the digital image with this disturbance; determining, using the classifier, a classification result for the perturbed image; determining, from the classification result, the impact of the disturbance on the classification result; optimizing the set of parameters to maximize this impact; and determining, based at least in part on the maximum impact, the sensitivity of the classifier.

16 Claims, 5 Drawing Sheets

(51) Int. Cl.
   *G06N 3/045*   (2023.01)
   *G06N 3/08*    (2023.01)
   *G06N 3/088*   (2023.01)
   *G06V 10/774*  (2022.01)
   *G06V 10/82*   (2022.01)
   *G06V 20/56*   (2022.01)
   *G06V 20/58*   (2022.01)

(52) U.S. Cl.
   CPC ............ *G06V 10/774* (2022.01); *G06V 10/82* (2022.01); *G06V 20/56* (2022.01); *G06V 20/582* (2022.01)

(56) References Cited

U.S. PATENT DOCUMENTS

| | | | |
|---|---|---|---|
| 2019/0310654 A1* | 10/2019 | Halder | B60W 60/00 |
| 2020/0285952 A1* | 9/2020 | Liu | G06N 3/08 |
| 2021/0089842 A1* | 3/2021 | Rosenfeld | G06N 3/088 |
| 2021/0125005 A1* | 4/2021 | Kuta | G06F 21/577 |
| 2021/0229680 A1* | 7/2021 | Chakravarty | G06V 20/56 |

OTHER PUBLICATIONS

Fawzi, Alhussein, Omar Fawzi, and Pascal Frossard. "Analysis of classifiers' robustness to adversarial perturbations." Machine learning 107.3 (2018): 481-508. (Year: 2018).*

Samangouei, Pouya, Maya Kabkab, and Rama Chellappa. "Defense-gan: Protecting classifiers against adversarial attacks using generative models." arXiv preprint arXiv:1805.06605 (2018). (Year: 2018).*

Qayyum, Adnan, et al. "Securing connected & autonomous vehicles: Challenges posed by adversarial machine learning and the way forward." IEEE Communications Surveys & Tutorials 22.2 (2020): 998-1026. (Year: 2020).*

Goodfellow, et al: "Generative Adversarial Nets", NIPS'14 Proceedings of the 27th International Conference on NeuralInformation Processing Systems, Dec. 8-13, 2014, pp. 1-9, XP055537898.

Wikipedia: "Generative adversarial network", accessed Sep. 30, 2020, pp. 1-10, XP055735561.

* cited by examiner

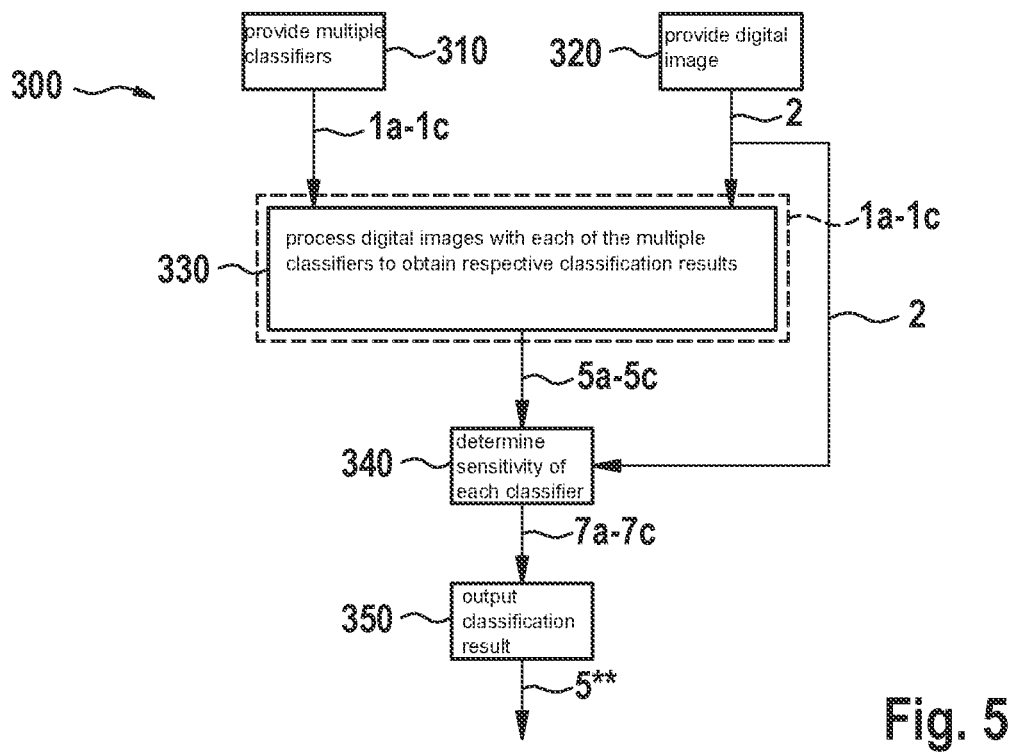

MEASURING THE SENSITIVITY OF NEURAL NETWORK IMAGE CLASSIFIERS AGAINST ADVERSARIAL ATTACKS

CROSS REFERENCE

The present application claims the benefit under 35 U.S.C. § 119 of European Patent Application No. EP 20166223.6 filed on Mar. 27, 2020, which is expressly incorporated herein by reference in its entirety.

FIELD

The present invention relates to neural network classifiers for digital images that may be used in safety or security relevant use cases.

BACKGROUND INFORMATION

When a human driver steers a vehicle through traffic, the eyes of the driver are the most important source for traffic-relevant information. After having spent only a few tens of hours and considerably less than 1,000 km behind the steering wheel, the driver's brain is trained to rapidly classify images of traffic situations as to which objects they contain and what needs to be done next, even if the situation is new and has not occurred during training.

For the at least partially automated driving of vehicles, it is intended to mimic this learning process by means of classifiers for digital images. Such classifiers are based on neural network. After a sufficient amount of training, they are able to identify traffic-relevant objects in the digital images quite reliably.

However, neural networks are inherently prone to so-called adversarial attacks. These attacks introduce small changes into the input images with the intention of provoking a misclassification of the image. For example, by attaching an inconspicuous sticker to a stop sign, the classifier may be made to misclassify the stop sign as a speed limit sign.

German Patent Application No. DE 10 2017 218 889 A1 describes a statistical method to evaluate the uncertainty of the output of a neural network. A high uncertainty may be a sign of an attempted adversarial attack.

SUMMARY

In accordance with the present invention, a method is provided for measuring the sensitivity of a classifier for digital images against adversarial attacks. The classifier comprises at least one neural network.

In accordance with an example embodiment of the present invention, the method starts with providing a digital image for which the sensitivity is to be measured. That is, the method starts from the assumption that the sensitivity is dependent on the digital image that is to be classified, and that this sensitivity is higher for some digital images than it is for other digital images. For example, if two objects are already quite similar and hard to distinguish by the classification, then the classificatory may need only a tiny adversarial "push" to tip over to a misclassification.

The method uses a generator that is trained to map elements of a latent space to a realistic image. That is, the latent space is defined and/or created by said training. Some examples for generators are:
- the generator part of a generative adversarial network, GAN, that is specifically trained to produce images that are hard to distinguish from real images in the target domain;
- the decoder part of an encoder-decoder network, which may be, e.g., an auto-encoder network that is trained to map an original digital image to a lower-dimensional representation in the latent space and reconstruct the original digital image from this representation; and
- a flow-based generative model that is based on estimating densities.

An element of the latent space is obtained using a set of parameters. For example, if the latent space is a vector or matrix space, the parameters may be the elements of the vector or matrix.

Using the generator, this element of the latent space is mapped to a disturbance in the space of realistic images. The digital image is perturbed with this disturbance. Using the classifier, a classification result for the perturbed image is obtained.

From this classification result, the impact of the disturbance is determined using any suitable metric. The set of parameters is then optimized to maximize this impact. That is, using an updated set of parameters, a new element of the latent space is obtained, a new disturbance in the space of realistic images is created from that element, and the digital image is perturbed with this new disturbance. Feedback is then obtained whether the new disturbance has a larger impact on the classification results than the previous disturbance as intended. Based on this feedback, the optimization algorithm chooses the next set of parameters to try. Any parameter optimization algorithm known in the art may be used for this purpose.

When the optimization algorithm terminates, there will be some maximum impact of a disturbance that has been achieved. Based at least in part on this maximum impact, the sensitivity of the classifier against adversarial attacks is determined.

During the optimization, a search is therefore performed for the disturbance that has the largest potential to change the classification result. But this search is not carried out directly in the space of digital images in which the disturbances also reside. Rather, the search is performed in the latent space. The reasoning behind this is three-fold:

First, neural networks that are used as classifiers may be much more sensitive to low frequency attacks, i.e., disturbances with smaller variations between pixels, than to high frequency attacks. This is particularly pronounced for networks that have been trained with adversarial images that capture high frequency noise ("adversarial training"). In return for more robustness against the high frequency noise, such adversarial training sacrifices some accuracy in the low frequency domain. If the network has been "naturally" trained (i.e., without a particular emphasis on adversarial images), it is more to bust against low frequency domain noise. The present method may be used to identify the low frequency domain disturbance that has the most impact on the classification result, so that the network may then be hardened against this kind of disturbance. The end result is that the network may be adversarially trained at a lesser price in terms of accuracy in the low frequency domain.

Because the generator has specifically been trained to map elements of its latent space to a realistic image, and realistic images tend to be relatively smooth, the disturbance created by the generator has a tendency to be smooth. That is, the search is specifically focused on smooth disturbances that are most likely to have a large impact on the classification result and that are also harder to detect by commonly used countermeasures against adversarial attacks: Some robustness certification methods try to detect high differences between neighboring pixels to determine if this input image has been compromised or modified in an attempt to provoke a misclassification. Such certification methods are particularly common for autonomous driving applications. Smooth disturbances might then evade detection.

Second, the latent spaces of many generators tend to have a much lower dimensionality than the space of digital images. In this case, an element in the latent space is characterized by much fewer parameters than a digital image. The search space is thus greatly reduced, and the computation is made faster. But for the method to work at all, it is not a requirement that the latent space of the generator must have a lower dimensionality than the space of digital images.

Third, the tendency of the disturbances to be rather smooth also rubs off onto the elements of the latent space to some extent. This means that when the optimization algorithm updates the parameters by some small amount, the change in the impact that results from this update can be expected not to be overly crass. In particular, when a disturbance is generated from an element of the latent space, interpolation is used. E.g., if two elements $z_1$, $z_2$ are close to each other in the latent space, their generated images $p_1$, $p_2$ should look more similar to the image $p_3$ generated by another $z_3$ that is farther away from $z_1$ in the latent space than $z_1$ is from $z_2$. Therefore, the generated disturbance is smoother than a disturbance that is optimized directly on the pixels in the space of digital images.

This is favorable for the convergence of the optimization algorithm. It would be more difficult to achieve convergence directly in the space of the digital images.

Furthermore, the so-generated disturbance is a good starting point for a further optimization towards a larger impact directly in the space of digital images. Such an optimization tends to be not globally convergent towards one single optimal solution, meaning that having a good starting point matters. Starting from a disturbance generated with the present method, a further optimization for a larger impact tends to make the disturbance more adversarial than if the optimization is started from something else.

As mentioned above, the impact may be determined using any suitable metric. Some examples of which quantities may go into such a metric are given in the following.

The determining of the impact may be based at least in part on a change to the loss function that results from the disturbance. (e.g., FIG. 1, step 171). The loss function represents the optimization goal that the classifier is being trained for; usually, the training of the classifier strives for a maximum or minimum value of this loss function. The change to the loss function is therefore a well-motivated indicator as to how badly the misclassification caused by the disturbance affects the intended application of the classifier. However, there may be applications where the loss function used for the training is not available, but a fully trained, finished classifier is simply to be taken as a given.

The determining of the impact may also be based at least in part on the difference between the classification result for the perturbed image and the classification result for the original digital image. (e.g., FIG. 1, step 172). This difference may again be measured according to any suitable metric. This metric may optionally take into account which types of misclassifications affect the intended application of the classifier to which extent. For example, traffic signs may be grouped in certain categories according to their meaning (e.g., sign giving orders, prohibition sign, limit sign, warning sign, right of way sign). If the classification of a sign in one category is changed to a different sign in the same category, this may be expected to have a less serious effect on the behavior of a vehicle than if the sign is recognized as one from a different category.

If ground truth for the classification of the digital image is available, the determining of the impact may also be based at least in part on the difference between the classification result for the perturbed image and this ground truth classification. (e.g., FIG. 1, step 173). For example, in a major use case where the measuring of the sensitivity is to be integrated into the training of the classifier, ground truth needs to be available for that training.

In an advantageous embodiment of the present invention, at least one transformation is applied to the disturbance before perturbing the digital image with this disturbance. The disturbance comprises at least one of translating, scaling, rotating, masking, or changing the transparency. For example, neural network classifiers may base their decision to attribute a particular class to an image more on particular portions of the image than on other portions of the image. This may be visualized in the so-called "saliency maps". If such a particularly salient portion of the image is affected by the disturbance, this may affect the classification result more than a change to a less salient portion of the image. The portions of the image that are particularly silent for the classifier need not correspond to the portions of the image that a human who looks at the image regards as silent when classifying it.

Also, the disturbance may have a stronger saliency with respect to another class, and thereby distract the classifier away from and suppress the real saliency with respect to the correct class. This is another reason why the impact of the disturbance may depend on transformations that change, e.g., the position of the disturbance in the image.

In particular, the transformation may be characterized by further parameters, and these further parameters may be included in the optimization. That is, the optimization algorithm strives to maximize the impact by a combined effort of changing the parameters that characterize the element of the latent space and changing the parameters that characterize the transformation.

As mentioned above, the method for measuring the sensitivity of the classifier may be integrated into the training of the classifier. The present invention therefore also provides a method for training a classifier for digital images.

In accordance with an example embodiment of the present invention, this method starts from a neural network for the classifier whose behavior is characterized by a set of parameters (e.g. weights) and a set of training images. The training images are labelled with at least one classification result that the classifier shall return when being given the respective training image. I.e., the labels constitute the "ground truth" to be used during training.

Training images are processed using the classifier to obtain classification results, and parameters of the neural network are optimized with the goal of improving the value of a loss function. This loss function is dependent at least in part on differences between the obtained classification results and the respective labels for the processed training images. On top of that, the loss function is also dependent on sensitivities of the classifier against adversarial attacks for the respective training images. The sensitivities may be measured according to the method as described above, but any other method may be used just as well.

The reasoning behind this training method is that most gains achieved during an optimization do not come "for free". When something is optimized towards a particular objective, this optimization is quite likely to change some other aspect that is not part of the objective for the worse. It therefore helps a great deal to have the sensitivity against adversarial attacks in the objective.

Not all classifiers are sensitive against the same disturbances to the same extent. Rather, a particular disturbance may drastically change the classification result of one classifier, while other classifiers may be completely unaffected by this same disturbance. This may be exploited to combine the strengths of different classifiers.

The present invention therefore also provides a method for classifying digital images. In accordance with an example embodiment of the present invention, the method starts from a digital image and multiple classifiers. Each such classifier comprises at least one neural network. The digital image is processed using each of the multiple classifiers to obtain respective classification results. A sensitivity of each classifier against adversarial attacks is determined for the digital image. The classification result produced by a classifier with the lowest sensitivity against adversarial attacks is outputted as the final classification result.

As discussed above, the sensitivity may be measured using the method described above, but also using any other suitable method.

Combining multiple classifiers in this manner achieves a better security against adversarial attacks than merely combining the classification results produced by the classifiers, e.g., by a weighted sum or some sort of voting mechanism. In order to change the final classification result, an adversarial attack will need to change the classification result even of the classifier that is hardest to fool by such an attack. This may necessitate making the disturbance so drastic that it is easily noticed.

Having some possibility to measure the sensitivity against adversarial attacks is particularly valuable for increasing the safety when a vehicle is being steered through traffic in an at least partially automated manner based on classification results generated from digital images.

The present invention therefore also provides a method for operating a vehicle. In accordance with an example embodiment of the present invention, using at least one sensor carried by the vehicle, digital images are obtained. Using at least one classifier, which comprises at least one neural network, classification results are obtained for the digital images. Based at least in part on the classification results, a power train, a steering system, and/or a braking system, of the vehicle is actuated.

A sensitivity of each used classifier against adversarial attacks is obtained for the digital image. As discussed above, the sensitivity may be measured using the method described at the beginning of this disclosure, but also using any other suitable method. In response to this sensitivity meeting a predetermined criterion (e.g., a threshold value), at least one remedial action is initiated in order to at least partially compensate the effect of this sensitivity on the safety of the vehicle.

In particular, the remedial action may specifically comprise:
  obtaining further digital images by a different sensor carried by the vehicle, and obtaining classification results for these further digital images; and/or
  obtaining further classification results for the digital images using a different classifier; and/or
  outputting an alarm to an occupant of the vehicle; and/or
  reducing the speed of the vehicle; and/or
  stopping the vehicle on a planned emergency stopping trajectory.

For example, the different sensor may be an additional camera, radar sensor or LIDAR sensor. Using a different sensor is particularly helpful in a situation where the classifier is particularly open to adversarial attacks due to the low quality of the digital images that are being acquired. For example, if visibility or lighting are poor, or if the sun shines right onto the optical axis of the camera and drives it into saturation, then the classification decision may have to be made based on a small amount of information, and may easily "tip over" to a different class. This may be avoided by using supplementary information from different sensors.

A similar situation arises in an access control system that is to grant access to a requesting entity in response to that entity furnishing an authorized physical access medium. The present invention therefore also provides a method for operating an access control system.

In accordance with an example embodiment of the present invention, in the course of this method, at least one digital image of a physical access medium furnished by an entity who requests access is obtained using at least one sensor. The digital image is processed using at least one classifier to obtain a classification result. The classifier comprises at least one neural network. The classification result is indicative of whether the access medium corresponds to an authorized access medium. In response to determining, based on the classification result, that the access medium corresponds to an authorized access medium, the access is granted to the requesting entity.

For example, the access medium may be a face that needs to correspond to a stored representation of an authorized face. Because GANs are very good at generating smooth human faces that may be misclassified by a classifier, it is advantageous to have, as described above, an analysis tool for disturbances. With this analysis tool, it can be analyzed to which extent the facial recognition system is robust to adversarial attacks.

The sensitivity of each used classifier against adversarial attacks is determined for the digital image. In response to this sensitivity meeting a predetermined criterion, at least one remedial action is initiated to increase the security against unauthorized access with a false and/or altered physical access medium. As discussed above, the sensitivity may be measured using the method described at the beginning of this disclosure, but also using any other suitable method.

Such remedial actions are likely to cause some inconvenience to the requesting entity. By making such remedial actions dependent on the sensitivity, they may be focused on situations where they are really needed for security, so that the inconvenience may be avoided in all other cases.

In particular, the remedial action may specifically comprise:
  obtaining further digital images by a different sensor, and obtaining classification results for these further digital images; and/or
  obtaining further classification results for the digital image using a different classifier; and/or
  demanding at least one additional form of authentication before granting access to the requesting entity; and/or
  refusing access to the requesting entity.

The provided method may be computer-implemented at least in part. The present invention therefore also provides computer program, comprising machine-readable instructions that, when executed by one or more computers, cause the one or more computers to perform one or more of the methods described above.

This computer program may be provided on a non-transitory machine-readable storage medium, or it may be sold as a downloadable product. One or more computers may be equipped with the computer program, with the storage medium, and/or with the download product.

Below, further advantageous embodiments are illustrated using Figures without any intention to limit the scope of the present invention.

BRIEF DESCRIPTION OF THE DRAWINGS

FIG. 5 shows an exemplary embodiment of the method 300 for classifying digital images 2, in accordance with the present invention.

FIG. 6 shows an exemplary embodiment of the method 400 for operating a vehicle, in accordance with the present invention.

DETAILED DESCRIPTION OF EXAMPLE EMBODIMENTS

Figure 1:
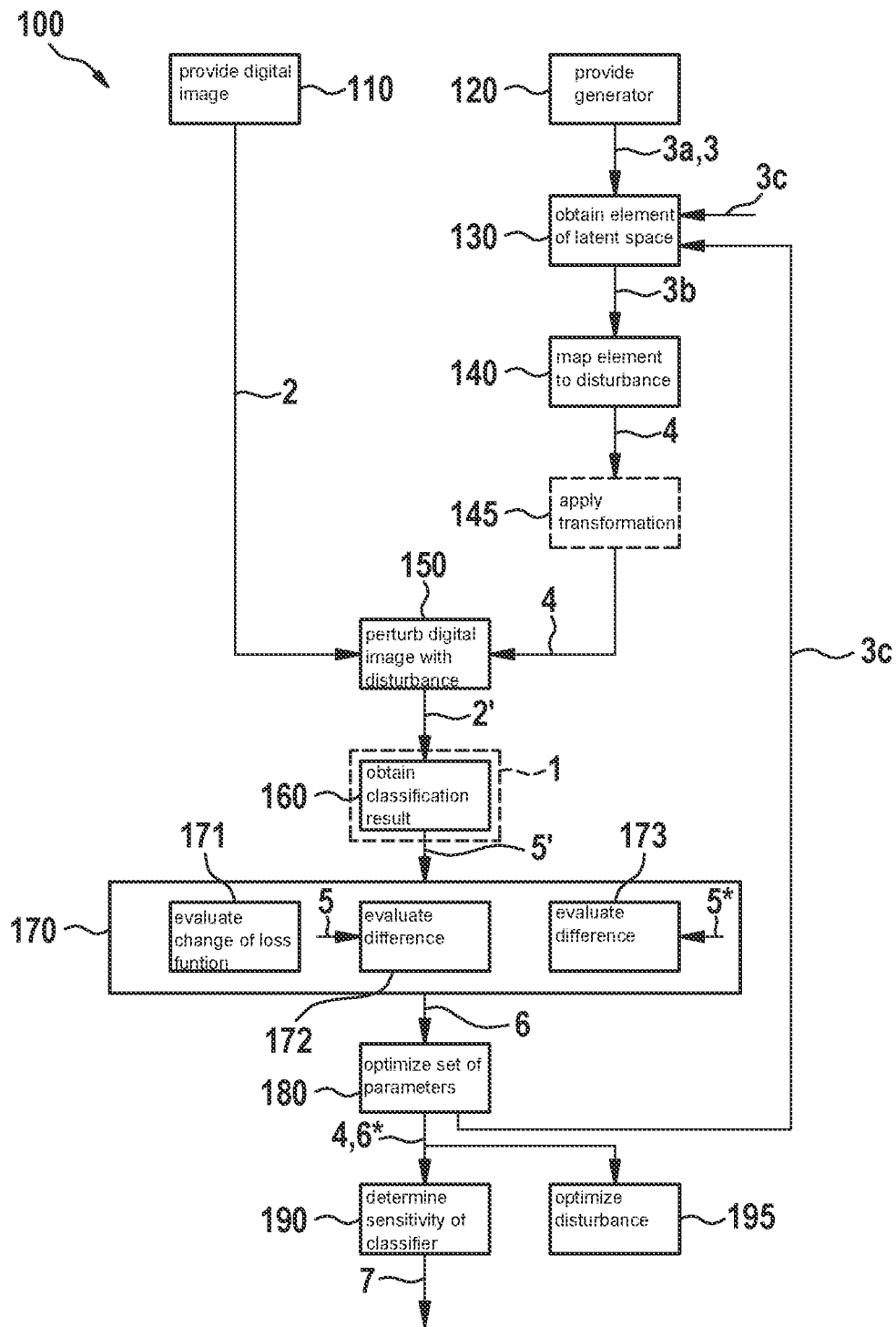
FIG. 1 shows an exemplary embodiment in accordance with the present invention of a method 100 for measuring the sensitivity 7 of a classifier 1.

FIG. 1 is a schematic flow chart of an embodiment of the method 100 for measuring the sensitivity 7 of a classifier 1.

In step 110, a digital image 2 is provided. The sensitivity 7 is to be measured for this digital image 2.

In step 120, a generator 3 is provided. This generator 3 is trained to map elements 3b of a latent space 3a to a realistic image. Based on a set of parameters 3c, in step 130, an element 3b of the latent space 3a is obtained. This element 3b is mapped to a disturbance 4 in the space of realistic images in step 140. The digital image 2 is perturbed with this disturbance 4 in step 150. Optionally, before this perturbing, one or more transformations are applied to the disturbance 4 in step 145.

In step 160, using the classifier 1, a classification result 5' is obtained for the perturbed image 2'. From this classification result 5', in step 170, the impact 6 of the disturbance 4 on the classification result 5' is determined.

The set of parameters 3c is optimized in step 180 to maximize the impact 6. After the optimization is finished, a maximum impact 6* results. Any suitable optimization method may be used in this step. For example, if the loss function of the classifier 1 is available, a gradient with respect to the parameters 3c may be calculated, and a gradient descent method may be applied. This gradient may be evaluated for only one digital image 2 for which the sensitivity 7 is to be investigated. If an average sensitivity 7 over a set of digital images 2 is to be measured, then the gradient may be averaged over all perturbed images 2'.

In step 190, the sensitivity 7 of the classifier 1 is determined, based at least in part on the maximum impact 6*.

In optional step 195, the disturbance 4 is optimized further in the space of digital images 2 to produce an updated disturbance 4' that has an even larger impact 6 on the classification result 5'. During the optimization 195, the impact 6 is evaluated in the same manner as during the optimization 180 based on images 2' that are perturbed with the updated disturbance 4'.

Figure 2A:
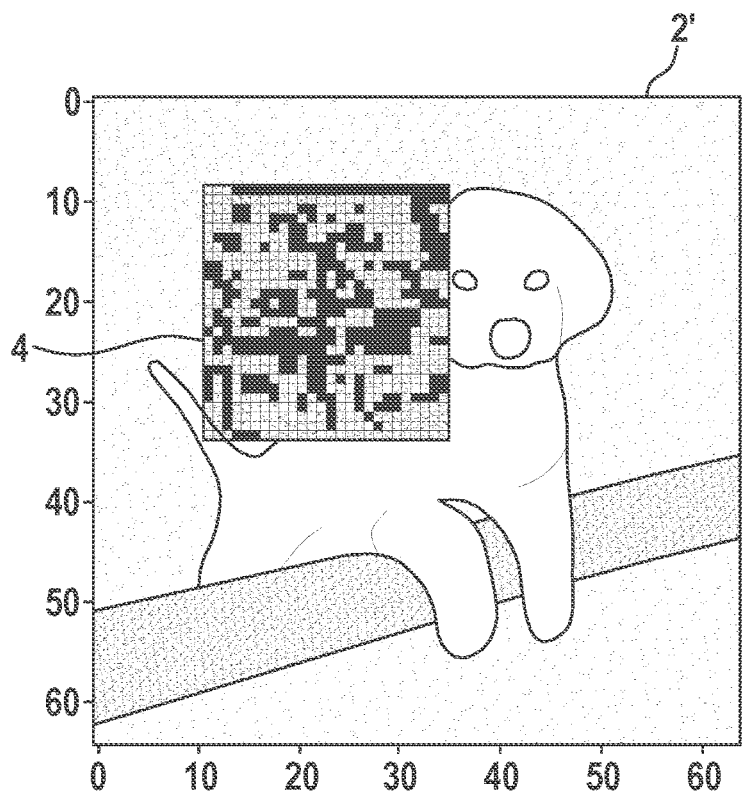
FIG. 2A shows an exemplary disturbance 4 produced during the optimization 180 in the space of digital images 2, in accordance with an example embodiment of the present invention.
Figure 2B:
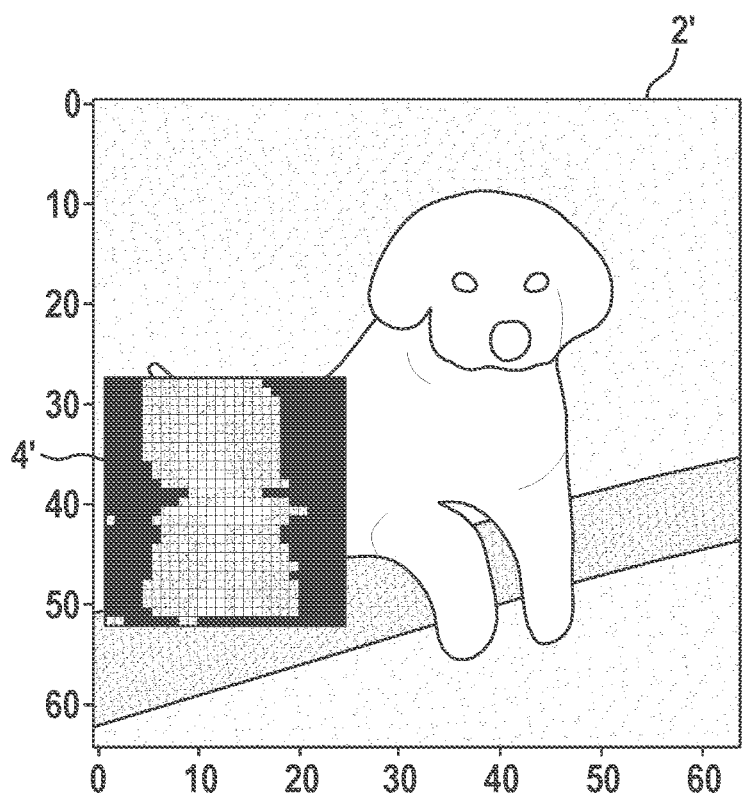
FIG. 2B shows further optimization 4' of the exemplary disturbance in the space of digital images 2, in accordance with an example embodiment of the present invention.

FIGS. 2A and 2B show the evolution of a perturbation 4 during the optimization 180. FIG. 2A is a perturbed image 2' that has been obtained by perturbing a digital image 2 of a dog with a disturbance 4 that has been produced by the optimization 180.

Starting from this, the disturbance 4 has been optimized further directly in the space of digital images 2 in step 195, to maximize the impact 6. After 975 iterations, the metric of this further optimization was satisfied, and the result 4' was obtained. FIG. 2B, is another perturbed image 2' that contains the disturbance 4' that has been optimized further directly in the space of digital images 2. Compared with FIG. 2A, the disturbance 4' has become a lot smoother, and it has also moved within the perturbed image 2'. That is, parameters for the translation of the disturbance have been included in the optimization 180 as well.

Figure 3:
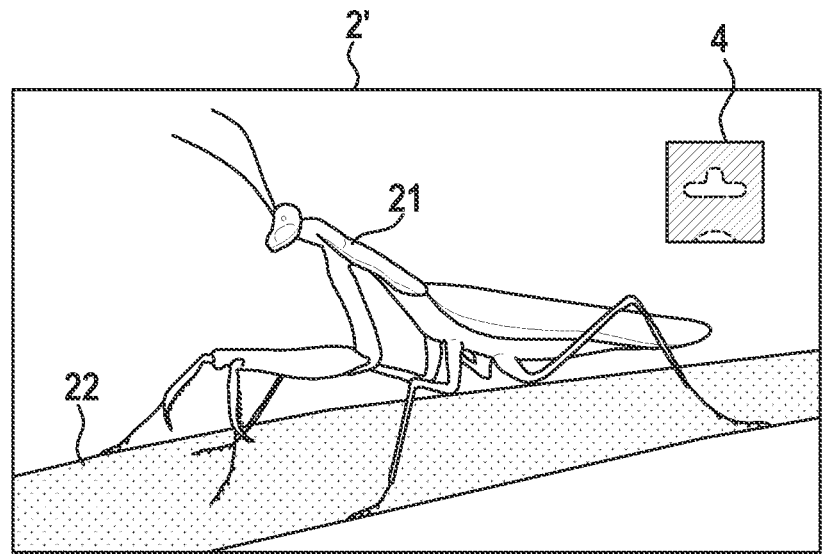
FIG. 3 shows a schematic example of an image 2' where a disturbance 4 causes a crass misclassification.

FIG. 3 shows another perturbed image 2' for which a particularly drastic misclassification could be achieved by the disturbance 4. The perturbed image 2' shows a mantis 21 sitting on a blade of grass 22. After the disturbance 4 had been added, the perturbed image 2' was misclassified as a wok by a fully trained ResNet model that previously had correctly classified the unperturbed image 2 as a mantis 21. the average classification accuracy of the ResNet model trained over TinyImageNet could be brought down from roughly 60% to 20% by the optimization 180 in the latent space 3a alone. Further optimization of disturbances 4 in the space of digital images 2 for maximum impact 6 brought the average classification accuracy of the ResNet model further down to about 8%.

Figure 4:
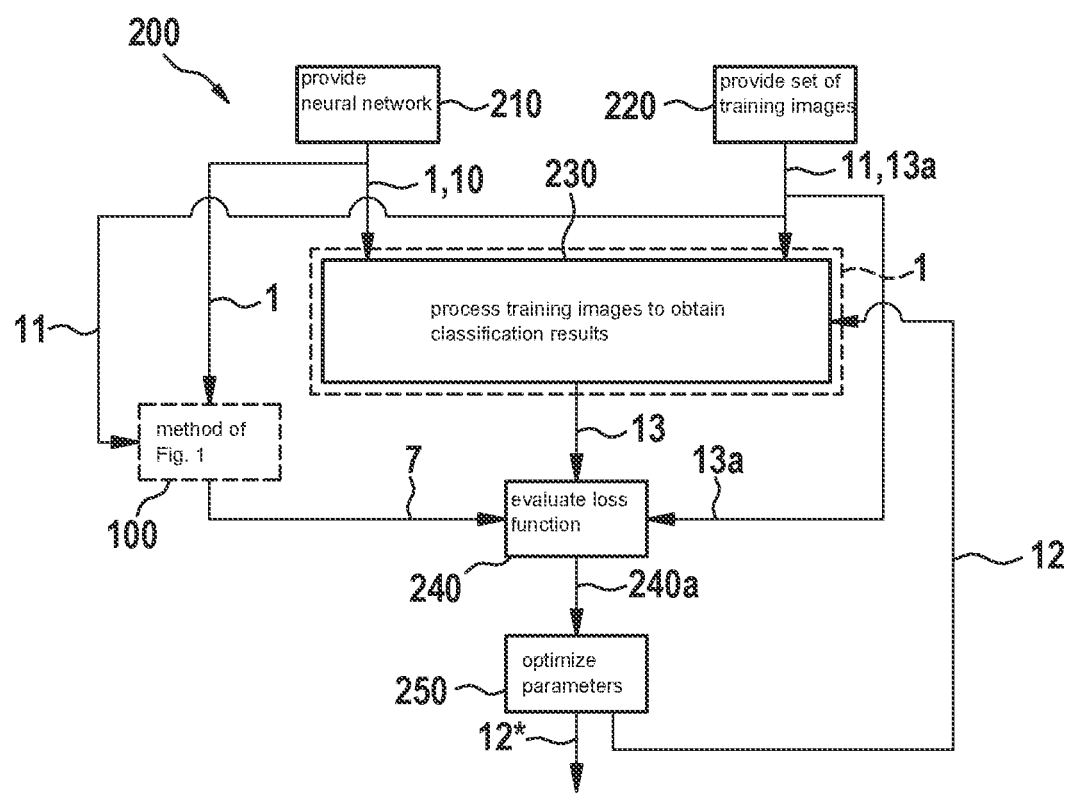
FIG. 4 shows an exemplary embodiment of the method 200 for training a classifier 1, in accordance with the present invention.

FIG. 4 is a schematic flow chart of an exemplary embodiment of the method 200 for training a classifier 1. In step 210, a neural network 10 for the classifier is provided. In step 220, a set of training images 11 is provided. Each training image 11 is labelled with a ground-truth classification result 13a.

The training images are processed in step 230 using the classifier 1 to obtain classification results 13. In step 240, a loss function that is dependent at least in part on differences between the obtained classification results 13 and the respective labels 13a for the processed training images 11, as well as on sensitivities 7 of the classifier 1 against adversarial attacks for the respective training images 11, is evaluated. In the example shown in FIG. 4, the sensitivity 7 is measured using the method 100 described above. In step 250, the parameters 12 that characterize the behavior of the neural network 10 of the classifier 1 are optimized with the goal of improving the value 240a of the loss function. The result is the optimal set of parameters 12*.

FIG. 5 is a schematic flow chart of an exemplary embodiment of the method 300 for classifying digital images 2. In step 310, multiple classifiers 1a-1c are provided. In step 320, a digital image 2 is provided. In step 330, the digital image 2 is processed using each of the multiple classifiers 1a-1c, to obtain respective classification results 5a-5c. Based on these classification results 5a-5c, in step 340, a sensitivity 7a-7c of each classifier 1a-1c against adversarial attacks is determined for the digital image 2. In step 350, the classification result 5a-5c produced by a classifier 1a-1c with the lowest sensitivity 7a-7c against adversarial attacks is outputted as the final classification result 5**.

FIG. 6 is a schematic flow chart of an exemplary embodiment of the method 400 for operating a vehicle. In step 410, digital images 2 are obtained using at least one sensor carried by the vehicle. In step 420, classification results 5 for the digital images 2 are obtained using at least one classifier 1. In step 430, a power train, a steering system, and/or a braking system, of the vehicle is actuated based at least in part of the classification results 5.

In step 440, a sensitivity of each classifier 1 against adversarial attack is determined for the digital image 2. In response to this sensitivity meeting a predetermined criterion (truth value 1 at diamond 450), in step 460, at least one remedial action is initiated in order to at least partially compensate the effect of said sensitivity 7 on the safety of the vehicle.

Figure 7:
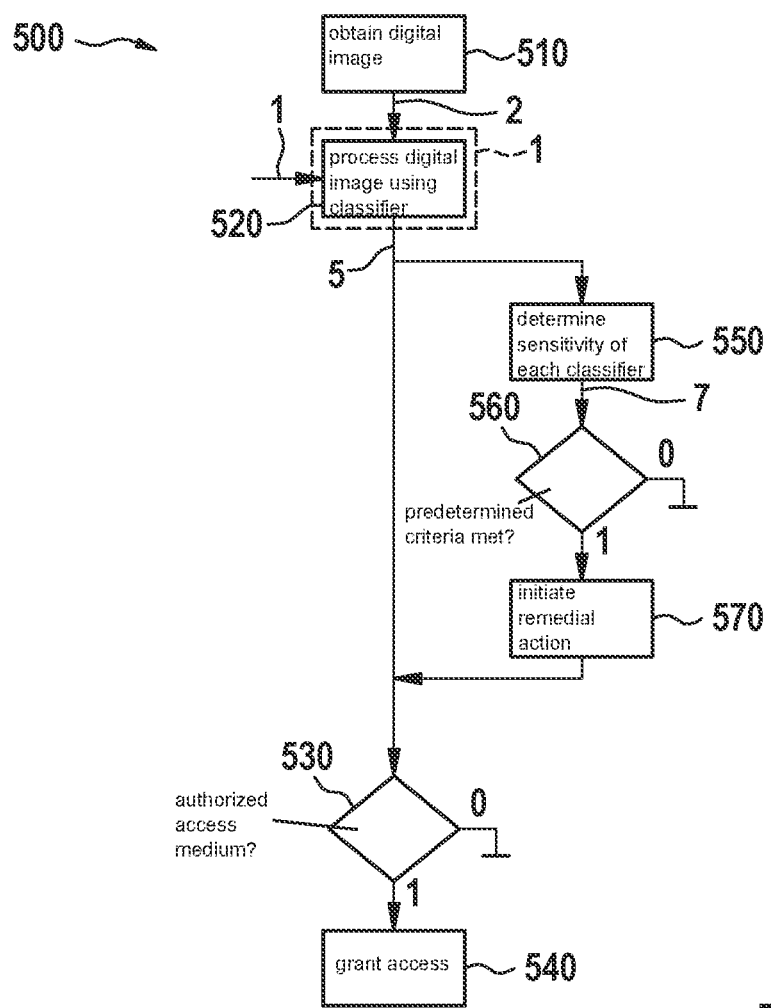
FIG. 7 shows an exemplary embodiment of the method 500 for operating an access control system, in accordance with the present invention.

FIG. 7 is a schematic flow chart of an exemplary embodiment of the method 500 for operating an access control system. In step 510, using at least one sensor, at least one digital image of a physical access medium furnished by an entity who requests access is obtained. In step 520, the digital image 2 is processed using at least one classifier 1, yielding a classification result 5. In response to determining, based on this classification result 5, that the access medium corresponds to an authorized access medium (truth value 1 at diamond 530), access is granted to the requesting entity in step 540.

In step 550, a sensitivity of each classifier 1 against adversarial attack is determined for the digital image 2. In response to this sensitivity meeting a predetermined criterion (truth value 1 at diamond 560), in step 570, at least one remedial action is initiated to increase the security against unauthorized access with a false and/or altered physical access medium.

What is claimed is:

1. A method for measuring sensitivity of a classifier for digital images against adversarial attacks, the classifier including at least one neural network, the method comprising the following steps:
    providing a digital image for which the sensitivity is to be measured;
    providing a generator trained to map elements of a latent space to a realistic image;
    gradually modifying a set of parameters over a plurality of cycles by performing the following in each of the cycles:
        obtaining, according to a current state of the set of parameters, a respective element of the latent space, wherein, after a first of the plurality of cycles, each other one of the plurality of cycles includes, prior to the obtaining of the respective element, making a respective change to the set of parameters, thereby causing the respective elements obtained in the cycles to differ from one another;
        mapping, using the generator, the element to a disturbance in a space of realistic images;
        perturbing the digital image with the disturbance;
        determining, using the classifier, a classification result for the perturbed image;
        determining, from the classification result, a respective impact of the disturbance on the classification result; and
        based on the determined respective impact, determining whether a maximum one of the impacts has been reached, wherein the gradual modification is terminated in response to the maximum impact being determined to have been reached; and
    determining, based at least in part on the maximum impact, the sensitivity of the classifier.

2. The method as recited in claim 1, wherein the generator is a generator part of a generative adversarial network (GAN), or a decoder part of an encoder-decoder network, or a flow-based deep generative model.

3. The method as recited in claim 1, wherein the determining of the respective impact includes:
    evaluating a change to a loss function used for training of the classifier that results from the disturbance; and/or
    evaluating a difference between the classification result for the perturbed image and a classification result for the digital image; and/or
    evaluating a difference between the classification result for the perturbed image and a ground-truth classification for the digital image.

4. The method as recited in claim 1, wherein the gradual modification further includes, in each of the cycles:
    before perturbing the digital image with the disturbance, applying to the disturbance at least one transformation that includes: translating and/or scaling and/or rotating and/or masking and/or changing a transparency.

5. The method as recited in claim 4, wherein the at least one transformation is characterized by further parameters and wherein the further parameters are subjected to an optimization for reaching the maximum impact.

6. The method as recited in claim 1, further comprising:
    optimizing the disturbance further in a space of digital images to produce an updated disturbance that has a larger impact on the classification result.

7. A method for training a classifier for digital images, the classifier including at least one neural network, the method comprising the following steps:
    providing a neural network for the classifier, wherein a behavior of the neural network is characterized by a set of parameters;
    providing a set of training images;
    processing the set of training images using the classifier, wherein the processing includes labelling each respective one of the training images with at least one classification result returned by the classifier for the respective one of the training images;
    evaluating a sensitivity of the classifier against adversarial attacks for the respective training images; and
    optimizing the parameters of the neural network to minimize the sensitivity.

8. The method as recited in claim 7, wherein the sensitivity of the classifier against adversarial attacks is determined by:
    providing a digital image for which the sensitivity is to be measured;
    providing a generator trained to map elements of a latent space to a realistic image;
    gradually modifying a set of parameters over a plurality of cycles by performing the following in each of the cycles:
        obtaining, according to a current state of the set of parameters, a respective element of the latent space, wherein, after a first of the plurality of cycles, each other one of the plurality of cycles includes, prior to the obtaining of the respective element, making a respective change to the set of parameters, thereby causing the respective elements obtained in the cycles to differ from one another;

mapping, using the generator, the element to a disturbance in a space of realistic images;
perturbing the digital image with the disturbance;
determining, using the classifier, a classification result for the perturbed image;
determining, from the classification result, a respective impact of the disturbance on the classification result; and
based on the determined respective impact, determining whether a maximum one of the impacts has been reached, wherein the gradual modification is terminated in response to the maximum impact being determined to have been reached; and
determining, based at least in part on the maximum impact, the sensitivity of the classifier.

9. A method for classifying a plurality of digital images, comprising the following steps:
providing multiple classifiers, each of the multiple classifiers including at least one neural network;
processing the digital images using each of the multiple classifiers to obtain respective classification results; and
for each respective one of the digital images:
determining a respective sensitivity of each of the multiple classifiers against adversarial attacks for the respective one of the digital images;
selecting a respective one of the multiple classifiers for which a least of the respective sensitivities has been determined, so that different ones of the multiple classifiers are selected for different ones of the digital images; and
outputting the respective classification result produced by the selected classifier of the multiple classifiers as a final classification result.

10. The method as recited in claim 9, wherein the determining of the respective sensitivity includes:
gradually modifying a set of parameters over a plurality of cycles by performing the following in each of the cycles:
obtaining, according to a current state of the set of parameters, a respective element of a latent space, wherein, after a first of the plurality of cycles, each other one of the plurality of cycles includes, prior to the obtaining of the respective element, making a respective change to the set of parameters, thereby causing the respective elements obtained in the cycles to differ from one another;
mapping the obtained respective element to a disturbance in a space of realistic images;
perturbing the respective digital image with the disturbance;
determining, using the respective classifier, a classification result for the perturbed image; and
determining, from the classification result, a respective impact of the disturbance on the classification result; and
based on the determined respective impact, determining whether a maximum one of the impacts has been reached, wherein the gradual modification is terminated in response to the maximum impact being determined to have been reached; and
determining, based at least in part on the maximum impact, the sensitivity of the respective classifier of the at least one classifier against adversarial attacks for the respective digital image.

11. A method for operating a vehicle, comprising the following steps:
obtaining, using at least one sensor carried by the vehicle, a digital image;
obtaining classification results for the digital image using at least one classifier, the at least one classifier including at least one neural network;
actuating a power train of the vehicle, and/or a steering system of the vehicle, and/or a braking system of the vehicle, based at least in part on the classification results;
for each of the at least one classifier:
gradually modifying a set of parameters over a plurality of cycles by performing the following in each of the cycles:
obtaining, according to a current state of the set of parameters, a respective element of a latent space, wherein, after a first of the plurality of cycles, each other one of the plurality of cycles includes, prior to the obtaining of the respective element, making a respective change to the set of parameters, thereby causing the respective elements obtained in the cycles to differ from one another;
mapping the obtained respective element to a disturbance in a space of realistic images;
perturbing the digital image with the disturbance;
determining, using the respective classifier, a classification result for the perturbed image;
determining, from the classification result, a respective impact of the disturbance on the classification result; and
based on the determined respective impact, determining whether a maximum one of the impacts has been reached, wherein the gradual modification is terminated in response to the maximum impact being determined to have been reached; and
determining, based at least in part on the maximum impact, the sensitivity of the respective classifier of the at least one classifier against adversarial attacks for the digital image; and
based on the sensitivity meeting a predetermined criterion, initiating at least one remedial action to at least partially compensate an effect of the sensitivity on safety of the vehicle.

12. The method as recited in claim 11, wherein the remedial action includes:
obtaining further digital images by a different sensor carried by the vehicle, and obtaining classification results for the further digital images; and/or
obtaining further classification results for the digital images using a different classifier; and/or
outputting an alarm to an occupant of the vehicle; and/or
reducing a speed of the vehicle; and/or
stopping the vehicle on a planned emergency stopping trajectory.

13. A method for operating an access control system, comprising the following steps:
obtaining, using at least one sensor, at least one digital image of a physical access medium furnished by an entity who requests access;
processing the at least one digital image using at least one classifier to obtain a classification result that is indicative of whether the access medium corresponds to an authorized access medium, wherein the classifier includes at least one neural network;

in response to determining, based on the classification result, that the access medium corresponds to an authorized access medium, granting the access to the requesting entity;

for each of the at least one classifier:
gradually modifying a set of parameters over a plurality of cycles by performing the following in each of the cycles:
obtaining, according to a current state of the set of parameters, a respective element of a latent space, wherein, after a first of the plurality of cycles, each other one of the plurality of cycles includes, prior to the obtaining of the respective element, making a respective change to the set of parameters, thereby causing the respective elements obtained in the cycles to differ from one another;
mapping the obtained respective element to a disturbance in a space of realistic images;
perturbing the digital image with the disturbance;
determining, using the respective classifier, a classification result for the perturbed image;
determining, from the classification result, a respective impact of the disturbance on the classification result; and
based on the determined respective impact, determining whether a maximum one of the impacts has been reached, wherein the gradual modification is terminated in response to the maximum impact being determined to have been reached; and
determining, based at least in part on the maximum impact, the sensitivity of the respective classifier of the at least one classifier against adversarial attacks for the digital image; and in response to the sensitivity meeting a predetermined criterion, initiating at least one remedial action to increase security against unauthorized access with a false and/or altered physical access medium.

14. The method as recited in claim 13, wherein the remedial action includes:
obtaining further digital images by a different sensor, and obtaining classification results for the further digital images; and/or
obtaining further classification results for the digital image using a different classifier;
and/or demanding at least one additional form of authentication before granting access to the requesting entity; and/or
refusing access to the requesting entity.

15. A non-transitory machine-readable storage medium on which is stored a computer program for measuring sensitivity of a classifier for digital images against adversarial attacks, the classifier including at least one neural network, the computer program, when executed by a computer, causing the computer to perform the following steps:
providing a digital image for which the sensitivity is to be measured;
providing a generator trained to map elements of a latent space to a realistic image;
gradually modifying a set of parameters over a plurality of cycles by performing the following in each of the cycles:
obtaining, according to a current state of the set of parameters, a respective element of the latent space, wherein, after a first of the plurality of cycles, each other one of the plurality of cycles includes, prior to the obtaining of the respective element, making a respective change to the set of parameters, thereby causing the respective elements obtained in the cycles to differ from one another;
mapping, using the generator, the element to a disturbance in a space of realistic images;
perturbing the digital image with the disturbance;
determining, using the classifier, a classification result for the perturbed image; and
determining, from the classification result, a respective impact of the disturbance on the classification result; and
based on the determined respective impact, determining whether a maximum one of the impacts has been reached, wherein the gradual modification is terminated in response to the maximum impact being determined to have been reached; and
determining, based at least in part on the maximum impact, the sensitivity of the classifier.

16. A computer configured to measure sensitivity of a classifier for digital images against adversarial attacks, the classifier including at least one neural network, the computer configured to:
provide a digital image for which the sensitivity is to be measured;
provide a generator trained to map elements of a latent space to a realistic image;
gradually modify a set of parameters over a plurality of cycles by performing the following in each of the cycles:
obtaining, according to a current state of the set of parameters, a respective element of the latent space, wherein, after a first of the plurality of cycles, each other one of the plurality of cycles includes, prior to the obtaining of the respective element, making a respective change to the set of parameters, thereby causing the respective elements obtained in the cycles to differ from one another;
mapping, using the generator, the element to a disturbance in a space of realistic images;
perturbing the digital image with the disturbance;
determining, using the classifier, a classification result for the perturbed image; and
determining, from the classification result, a respective impact of the disturbance on the classification result; and
based on the determined respective impact, determining whether a maximum one of the impacts has been reached, wherein the gradual modification is terminated in response to the maximum impact being determined to have been reached; and determine, based at least in part on the maximum impact, the sensitivity of the classifier.

* * * * *